United States Patent
Chen

(10) Patent No.: US 10,563,332 B2
(45) Date of Patent: Feb. 18, 2020

(54) CLOSED-LOOP CONTROL DEVICE OF A MECHANICAL SEWING MACHINE AND METHOD FOR CONTROLLING THE SAME

(71) Applicant: Hsuan-Tai Chen, Nantou County (TW)

(72) Inventor: Hsuan-Tai Chen, Nantou County (TW)

( * ) Notice: Subject to any disclaimer, the term of this patent is extended or adjusted under 35 U.S.C. 154(b) by 413 days.

(21) Appl. No.: 15/454,540

(22) Filed: Mar. 9, 2017

(65) Prior Publication Data

US 2017/0275799 A1    Sep. 28, 2017

(30) Foreign Application Priority Data

Mar. 28, 2016 (TW) .............................. 105109696 A

(51) Int. Cl.
| | | |
|---|---|---|
| *D05B 69/18* | (2006.01) | |
| *D05B 69/28* | (2006.01) | |
| *H02P 7/28* | (2016.01) | |

(52) U.S. Cl.
CPC ............. *D05B 69/18* (2013.01); *D05B 69/28* (2013.01); *H02P 7/2805* (2013.01)

(58) Field of Classification Search
CPC ........ D05B 69/18; D05B 69/28; D05B 19/02; D05B 19/12; D05B 19/14
USPC ........................................................ 700/136
See application file for complete search history.

(56) References Cited

U.S. PATENT DOCUMENTS

| | | | | |
|---|---|---|---|---|
| 3,715,642 A | * | 2/1973 | Walter .................. | D05B 69/18 318/269 |
| 3,832,613 A | * | 8/1974 | Bernstein ............... | D05B 69/22 318/269 |
| 3,860,860 A | * | 1/1975 | Moran .................. | D05B 69/26 318/375 |
| 4,456,859 A | * | 6/1984 | Watanabe .............. | D05B 69/22 112/220 |
| 4,627,370 A | * | 12/1986 | Nakamura .......... | H02P 29/0022 112/275 |
| 4,692,676 A | * | 9/1987 | Dohi ...................... | D05B 69/26 112/275 |

(Continued)

FOREIGN PATENT DOCUMENTS

| | | |
|---|---|---|
| DE | 3037877 A1 | 4/1981 |
| EP | 0081684 A1 | 6/1983 |

(Continued)

*Primary Examiner* — Nathan E Durham
(74) *Attorney, Agent, or Firm* — Rabin & Berdo, P.C.

(57) ABSTRACT

A closed-loop control device of a mechanical sewing machine includes an isolated switch-mode power supply module, a DC motor, a speed control module, a processor, an electronic switch, a current detection module and a voltage detection module. The isolated switch-mode power supply module rectifies an AC power to a DC power and supplies the DC power to the DC motor. The speed control module sends a speed signal to the processor. The processor adjusts an output voltage to the DC motor according to the speed signal. The current detection module and the voltage detection module further detect an operating current signal and an operating voltage signal of the DC motor for the processor to control a turn-on time of the electronic switch to adjust an average operating voltage of the DC motor according to the operating current signal, the operating voltage signal and the speed signal.

4 Claims, 8 Drawing Sheets

(56) References Cited

U.S. PATENT DOCUMENTS

| | | | | |
|---|---|---|---|---|
| 4,714,039 A | * | 12/1987 | Shimada | D05B 69/22 |
| | | | | 112/275 |
| 4,738,211 A | * | 4/1988 | Nakamura | D05B 69/18 |
| | | | | 112/277 |
| 5,271,346 A | * | 12/1993 | Mori | D05B 69/18 |
| | | | | 112/220 |
| 5,304,901 A | * | 4/1994 | Mori | D05B 69/18 |
| | | | | 112/275 |
| 5,341,454 A | * | 8/1994 | Orii | D05B 69/18 |
| | | | | 388/815 |

FOREIGN PATENT DOCUMENTS

| | | |
|---|---|---|
| EP | 1710905 A1 | 10/2006 |
| JP | 2006149429 A | 6/2006 |

\* cited by examiner

CLOSED-LOOP CONTROL DEVICE OF A MECHANICAL SEWING MACHINE AND METHOD FOR CONTROLLING THE SAME

BACKGROUND OF THE INVENTION

1. Field of the Invention

The present invention relates to a closed-loop control device and, more particularly, to a control device having voltage and current detection modules mounted between a DC motor and a processor and receiving operating voltage of the DC motor as feedback to the processor for the processor to control the operating voltage of the DC motor through closed-loop control, and to a method for controlling the control device.

2. Description of the Related Art

Sewing machines in current market include computerized sewing machines and mechanical sewing machines. Computerized sewing machines employ software programs to control a rotation encoder for sewing operation. Despite the availability of embroidery function, computerized sewing machines are usually more costly. As there is no embroidery function, mechanical sewing machines are less costly relative to computerized sewing machines. Generally, the sewing speed of mechanical sewing machines is adjusted by users to control the pedal of the sewing machine for adjustment of a rotation angle or height of the pedal. Thus, the rotation speed of the DC (Direct Current) motor of mechanical sewing machines or the sewing speed can be changed. However, as the sewing speed of mechanical sewing machines is adjusted depending on users' habit or sewing demand, mechanical sewing machines usually have no precise control over the sewing speed.

With reference to FIG. 7, an equivalent circuit of a DC motor is shown with Vm representing an operating voltage, Ra representing an internal resistance, Ia representing an armature current, and E representing an induced EMF (Electromotive Force) generated by an armature when cutting a magnetic field, and an equation associated with the foregoing parameters can be expressed as follows:

$$Vm = IaRa + E$$

The induced EMF E can be further expressed as:

$$E = K\Phi N$$

where K is a winding factor of the armature, $\Phi$ is magnetic flux, and N is a rotation speed of the DC motor.

From the foregoing two equations, the rotation speed of the DC motor can be expressed as:

$$N = \frac{Vm - IaRa}{K\Phi}$$

As can be seen from the above equation, the rotation speed N of the DC motor can be adjusted by controlling the operating voltage Vm.

The rotation speed of the DC motor in conventional mechanical sewing machines can be adjusted by varying the rotation angle or height of the pedal to change the operating voltage Vm of the DC motor. However, when users intend to apply fixed operating voltage Vm for the DC motor to rotate at a constant rotation speed, a counter EMF will prevent the armature winding from rotating. To keep the armature winding running at a constant speed, additional power needs to be provided to allow the DC motor to run at a constant speed. Such need of additional power causes the armature current Ia to rise. When the rotation speed of the DC motor is constant, the rising armature current Ia will cause the operating voltage Vm to drop. Such voltage drop of the operating voltage Vm further leads to a lower rotation speed of the DC motor. In turn, to maintain the constant rotation speed of the DC motor, the lower rotation speed of the DC motor should be compensated by tilting the pedal to increase the rotation angle of the pedal and then again increase the operating voltage Vm.

Therefore, the DC motor of the conventional mechanical sewing machines requires the use of high-voltage (HV) DC motor (HV DC motor) with high power for normal operation. This is why high armature current Ia and high operating voltage Vm of the HV DC motor become inevitable in the conventional mechanical sewing machines, and the outcome is the rise of operating temperature of the HV DC motor, which results in issues of short life duration, high power consumption, high operating temperature, and brush sparking of the HV DC motor attributable to a worse operational safety.

SUMMARY OF THE INVENTION

An objective of the present invention is to provide a closed-loop control device of a mechanical sewing machine and a method for controlling the closed-loop control device, which employs a processor to vary a turn-on time of an electronic switch to adjust an operating voltage of the DC motor, and further raise the operating voltage by adjusting the duty cycle of the operating voltage according to an armature current and the operating voltage of the DC motor, such that no change should be made to the rotation angle of the foot pedal of the sewing machine to maintain the rotation speed of the DC motor.

To achieve the foregoing objective, the closed-loop control device of a mechanical sewing machine includes an isolated switch-mode power supply module, a DC (Direct Current) motor, a speed control module, a processor, an electronic switch, a current detection module and a voltage detection module.

The isolated switch-mode power supply module has an input terminal and an output terminal.

The input terminal is adapted to connect to an AC (Alternating Current) power source.

The output terminal outputs an operating voltage.

The DC motor is connected to the output terminal of the isolated switch-mode power supply module to receive the operating voltage.

The speed control module outputs a speed signal.

The processor is connected to the speed control module and outputs a control signal according to the speed signal.

The electronic switch is connected between the DC motor and the processor, controls a turn-on time of the electronic switch according to the control signal, and adjusts an average operating voltage.

The current detection module is connected between the electronic switch and the processor, detects an operating current of the DC motor, and generates an operating current signal.

The voltage detection module is connected between the DC motor and the processor, detects an operating voltage of the DC motor, and generates an operating voltage signal.

The processor further adjusts the control signal according to the operating current signal and the operating voltage signal.

To achieve the foregoing objective, the method for controlling the foregoing closed-loop control device includes steps of:

acquiring a rotation angle of the foot pedal;

supplying a power corresponding to the rotation angle of the foot pedal to the DC motor for the DC motor to operate;

calculating an operating power of the DC motor;

determine if the operating power is equal to a preset power; and when the operating power is not equal to the preset power, adjusting the operating power of the DC motor.

According to the foregoing description, the isolated switch-mode power supply module rectifies an AC power to a DC power and supplies the DC power to the DC motor. The processor applies the pulse width modulation technique to adjust a turn-on time of the electronic switch to further adjust the operating voltage and the operating current of the LV DC motor. By controlling the operating power of the LV DC motor, the rotation speed of the LV DC motor can be adjusted. A power corresponding to the rotation angle of the foot pedal is supplied to the LV DC motor first. The current detection module and the voltage detection module detect the operating current signal and the operating voltage signal of the LV DC motor, and further calculate the operating power of the LV DC motor according to the operating current signal and the operating voltage signal. The calculated operating power is compared with the preset power. If unequal, a closed-loop control approach is applied to adjust the operating power of the LV DC motor until the operating power is equal to the preset power. Therefore, the DC motor can be stably operated at a lower operating voltage relative to HV DC motors in conventional mechanical sewing machines. The issues of excessively high current and voltage, escalated load power, more power consumption and shorter life cycle of the DC motor, which results from higher operating voltage in HV DC motors of conventional mechanical sewing machines due to the increase of the rotation angle of the foot pedal for maintaining or increasing the rotation speed of the DC motor while the operating voltage of the DC motor decreases as a result of the increase of the operating current of the DC motor, can be avoided.

Other objectives, advantages and novel features of the invention will become more apparent from the following detailed description when taken in conjunction with the accompanying drawings.

DETAILED DESCRIPTION OF THE INVENTION

Figure 1:
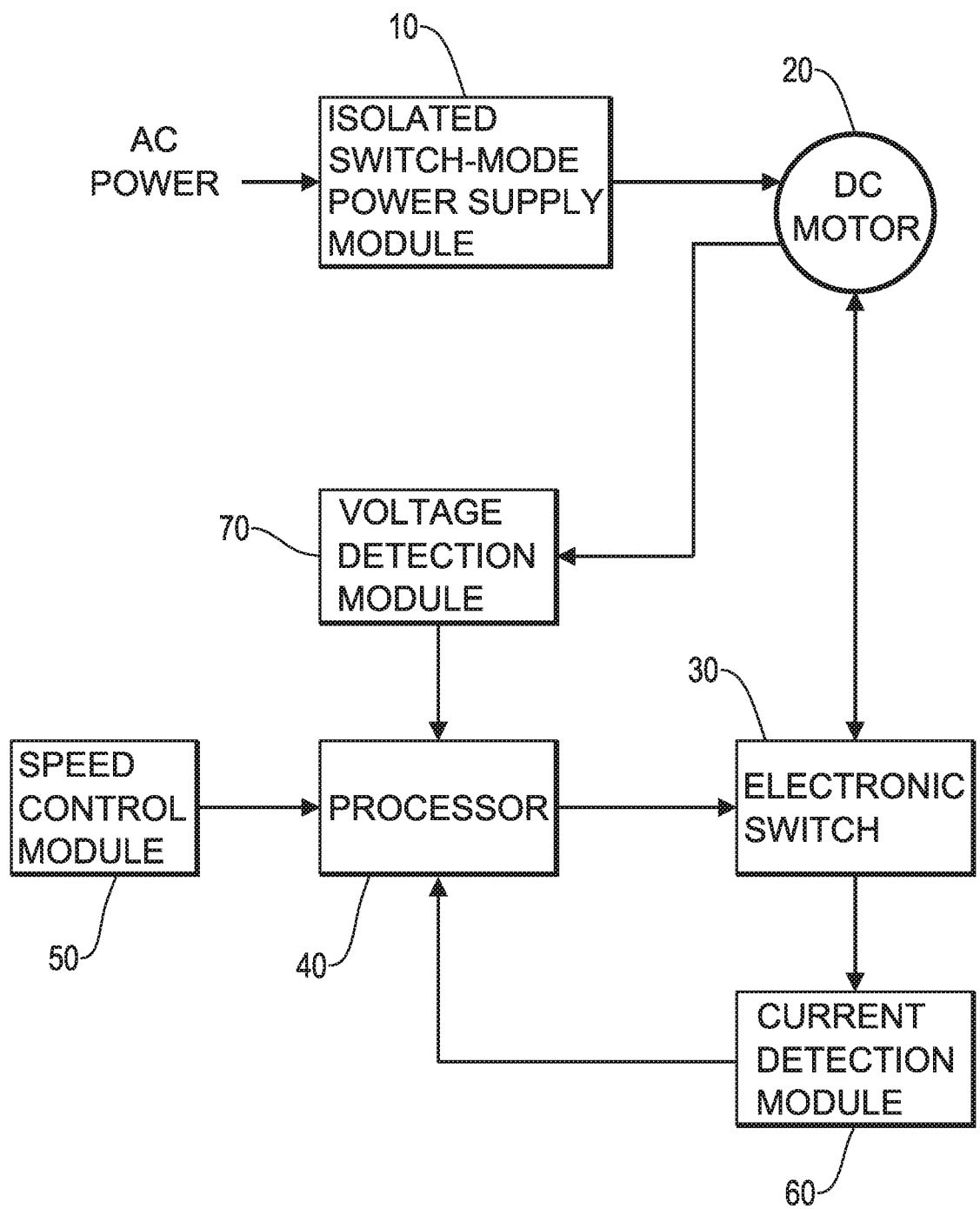
FIG. 1 is a functional block diagram of an embodiment of a closed-loop control device of a mechanical sewing machine in accordance with the present invention.

With reference to FIG. 1, a closed-loop control device of a mechanical sewing machine in accordance with the present invention includes an isolated switch-mode power supply module 10, a DC (Direct Current) motor 20, an electronic switch 30, a processor 40, a speed control module 50, a current detection module 60, and a voltage detection module 70. An input terminal of the isolated switch-mode power supply module 10 is connected to an external AC (Alternating Current) power source. An output terminal of the isolated switch-mode power supply module 10 is connected to the DC motor 30. An output terminal and an input terminal of the electronic switch 30 are respectively connected to the DC motor 20 and a first output terminal of the processor 40. An output terminal of the speed control module 50 is connected to a first input terminal of the processor 40. An input terminal and an output terminal of the current detection module 60 are respectively connected to the electronic switch 30 and a second input terminal of the processor 40. An input terminal and an output terminal of the voltage detection module 70 are respectively connected to the DC motor 20 and a third input terminal of the processor 40.

Figure 2A:
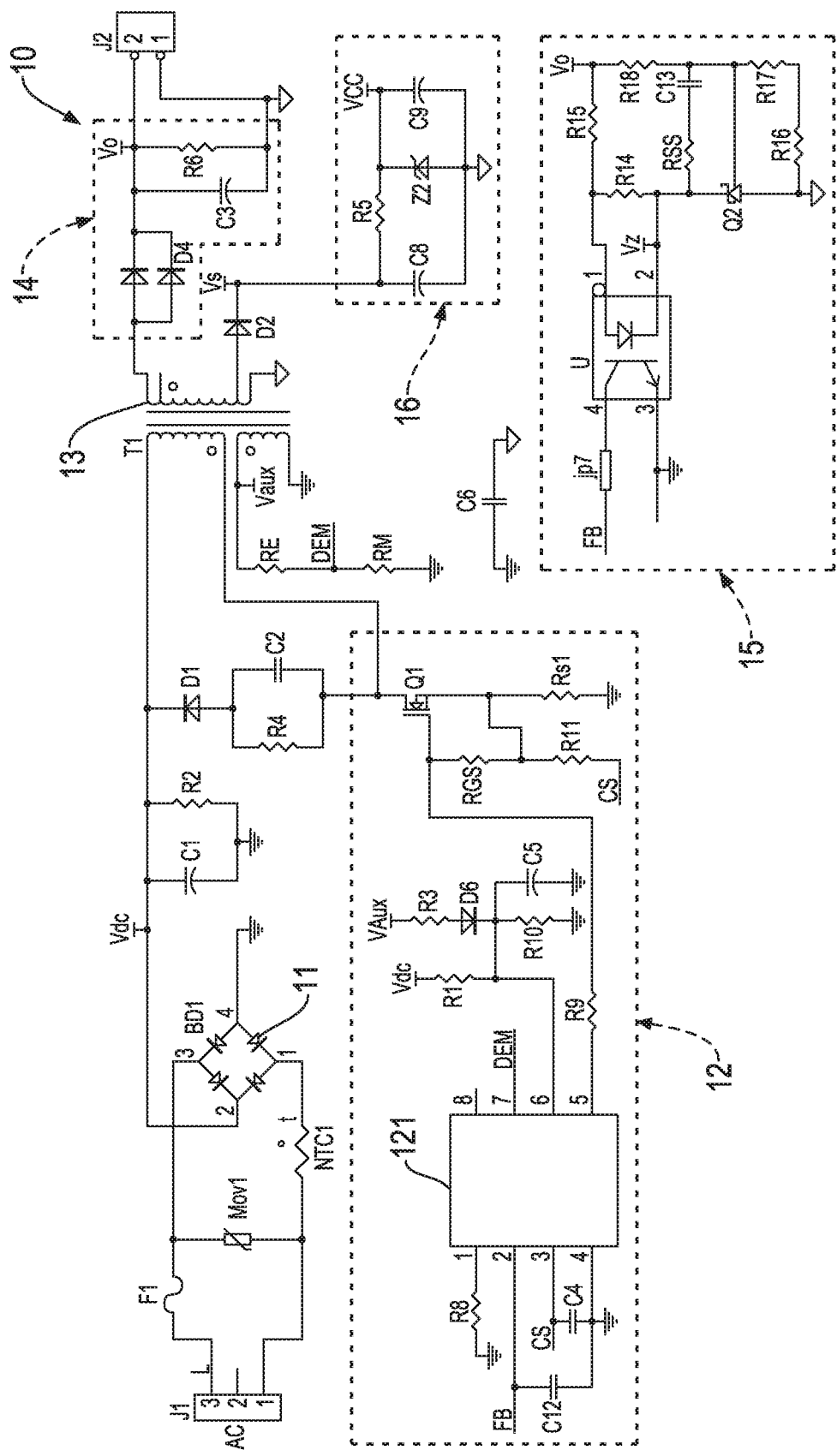
FIGS. 2A and 2B are circuit diagrams of the closed-loop control device in FIG. 1.
Figure 2B:
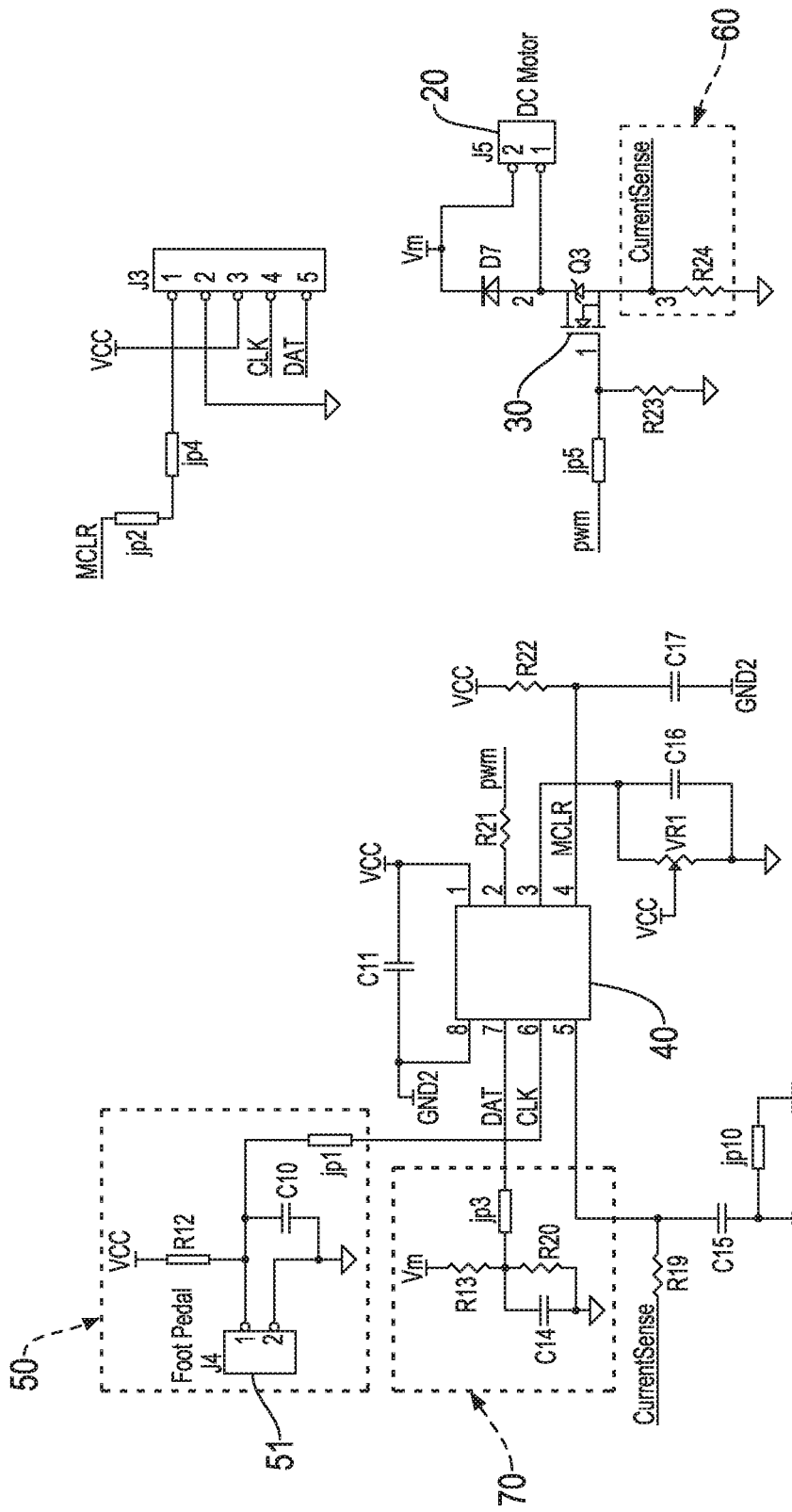

With reference to FIGS. 2A and 2B, the input terminal of the isolated switch-mode power supply module 10 is connected to the external AC power source through a connector J1 for the isolated switch-mode power supply module 10 to convert the AC power of the external AC power source into an output voltage Vo to supply the DC motor 20. The isolated switch-mode power supply module 10 includes a rectification unit 11, a voltage regulation unit 12, a transformer 13, a rectifier and filter circuit 14, and a voltage feedback circuit 15.

The rectification unit 11 may be a full-wave rectifier with input terminals (terminals 1 and 3) connected to the external AC power source to rectify AC power of the external AC power source to an DC voltage Vdc, and output terminals (terminals 2 and 4) outputting the DC voltage Vdc to the primary side of the transformer 13.

The voltage regulation circuit 12 has a PWM (Pulse Width Modulation) IC (Integrated Circuit) 121 and an electronic power switch Q1. The PWM IC 121 has a gate-driving pin 5, a power input pin 6 and a voltage feedback pin 2. The electronic power switch Q1 is connected between the PWM IC 121 and the primary side of the transformer 13, and may be an MOSFET (Metal Oxide Semiconductor Field Effect Transistor) with the drain connected to the primary side of the transformer 13, the source connected to the ground, and the gate connected to the gate-driving pin 5 of the PWM IC 121. The PWM IC 121 controls the turn-on time of the electronic power switch Q1 to adjust the duty cycle of the DC voltage Vdc and adjust an average output value of the DC voltage Vdc.

The primary side of the transformer 13 has an input winding and an auxiliary winding. The secondary side of the transformer 13 has an output winding. The auxiliary winding outputs an auxiliary voltage Vaux, which supplies the power to the PWM IC 121 form pin 6.

The output winding of the transformer 13 is connected to the rectifier and filter circuit 14. The transformer 13 regulates the DC voltage Vdc. After the regulated DC voltage passes through the rectifier and filter circuit 14 for rectification and filtering, the output voltage Vo is outputted to an output connector J2. A tap of the output winding of the transformer 13 is connected to an LED (Light-emitting Diode) D2 to output an LED voltage Vs. The LED voltage Vs passes through a voltage stabilization circuit 16 and is converted into a processor voltage Vcc, which is provided to the processor 40.

The voltage feedback circuit 15 is connected between the rectifier and filter circuit 14 and the PWM IC 121, and is connected to the voltage feedback pin 2 of the PWM IC 121 to feedback the output voltage Vo outputted by the rectifier and filter circuit 14 to the PWM IC 121, such that the PWM IC 121 controls the turn-on time of the electronic power switch Q1 according to the output voltage Vo to adjust the duty cycle of the DC voltage Vdc and the pulsating value of the DC voltage Vdc inputted to the input winding of the transformer 13, allowing the rectifier and filter circuit 14 to stably output the output voltage Vo. The voltage feedback circuit 15 has a voltage comparator Q2 and an opto-coupler U. After the output voltage Vo is divided by a voltage divider with resistors R17, R18, the voltage comparator Q2 outputs a feedback voltage Vz to input terminals of the opto-coupler U (optical transmitter, pins 1, 2 of the opto-coupler). The opto-coupler U transmits an optical signal to output terminals of the opto-coupler U (optical receiver, pins 3, 4 of the opto-coupler), so as to output a feedback voltage signal to the voltage feedback pin 2 of the PWM IC 121. By virtue of optical transmission used between input terminals and output terminals of the opto-coupler U, there is no physical connection between input terminals and output terminals of the opto-coupler U, rendering the opto-coupler U with good effect of isolating the primary side and the secondary side of the transformer 13. The isolated switch-mode power supply module 10 relies on the voltage feedback circuit 15 to measure the output voltage Vo of an output terminal of the rectifier and filter circuit 14 and feedback the output voltage Vo to the PWM IC 121 for adjusting the output voltage Vo, achieving a closed-loop control effect, and mitigating error in output of rotation speed of the DC motor 20.

The electronic switch 30 is connected between the DC motor 20 and the processor 40, and may be an N-channel FET (Field Effect Transistor) with its gate, drain and source respectively connected to a second output terminal of the processor 40, the DC motor 20 and the current detection module 60.

The processor 40 is connected to the electronic switch 30, the speed control module 50, the current detection module 60, and the voltage detection module 70. The processor 40 has two power pins 1, 8, a voltage signal pin 7, a speed signal pin 6, a current signal pin 5, an input pin 4, an auxiliary pin 3, and an output pin 6. One of the two power pins 1 is connected to the processor voltage Vcc, and the other power pin 8 is grounded. The output pin 2 is connected to the gate of the electronic switch 30 to output a control signal to the electronic switch 30 so as to control a turn-on time of the electronic switch 30, an average operating voltage Vm into the DC motor 20 and the duty cycle of an operating current into the DC motor 20, and adjusting an operating power of the DC motor 20 for control over the rotation speed of the DC motor 20. The input pin 4, the voltage signal pin 7 and the speed signal pin 6 are connected to an external controller through a connector J3, which input commands to the processor 40 to instruct the processor 40 to operate according to the inputted commands.

An input terminal of the speed control module 50 is connected to a foot pedal 51 of the mechanical sewing machine, which is connected to a power source. When users step on the foot pedal 51 to rotate the foot pedal 51 by a rotation angle, an output terminal of the speed control module 50 outputs a speed signal corresponding to the rotation angle. The speed signal is outputted to the speed signal pin 6 of the processor 40, and may be a voltage signal with a voltage value varying with the rotation angle of the foot pedal 51. The processor 40 adjusts the control signal to the electronic switch 30 according to the received speed signal to vary the average operating voltage Vm. The power source in connection with the foot pedal 51 may be the processor voltage Vcc from the output winding of the transformer 13.

An input terminal and an output terminal of the current detection module 60 are respectively connected to the source of the electronic switch 30 and the current signal pin 5 of the processor 40, such that the operating current flowing through the DC motor 20 further passes through the current detection module 60 and generates an operating current signal that is inputted to the processor 40.

The input terminal and the output terminal of the voltage detection module 70 are respectively connected to the DC motor 20 and the voltage signal pin 7 of the processor 40, such that the voltage detection module 70 generates an operating voltage signal according to the average operating voltage Vm of the DC motor passing through the voltage detection module 70, and inputs the operating voltage signal to the processor 40.

The current detection module 60 and the voltage detection module 70 feedback the operating voltage signal and the operating current signal to the processor 40 for the processor 40 to adjust the control signal according to the operating voltage signal and the operating current signal, thereby fixing the issue of the operating voltage drop in the DC motor 20 and attaining the closed-loop control effect.

Figure 3:
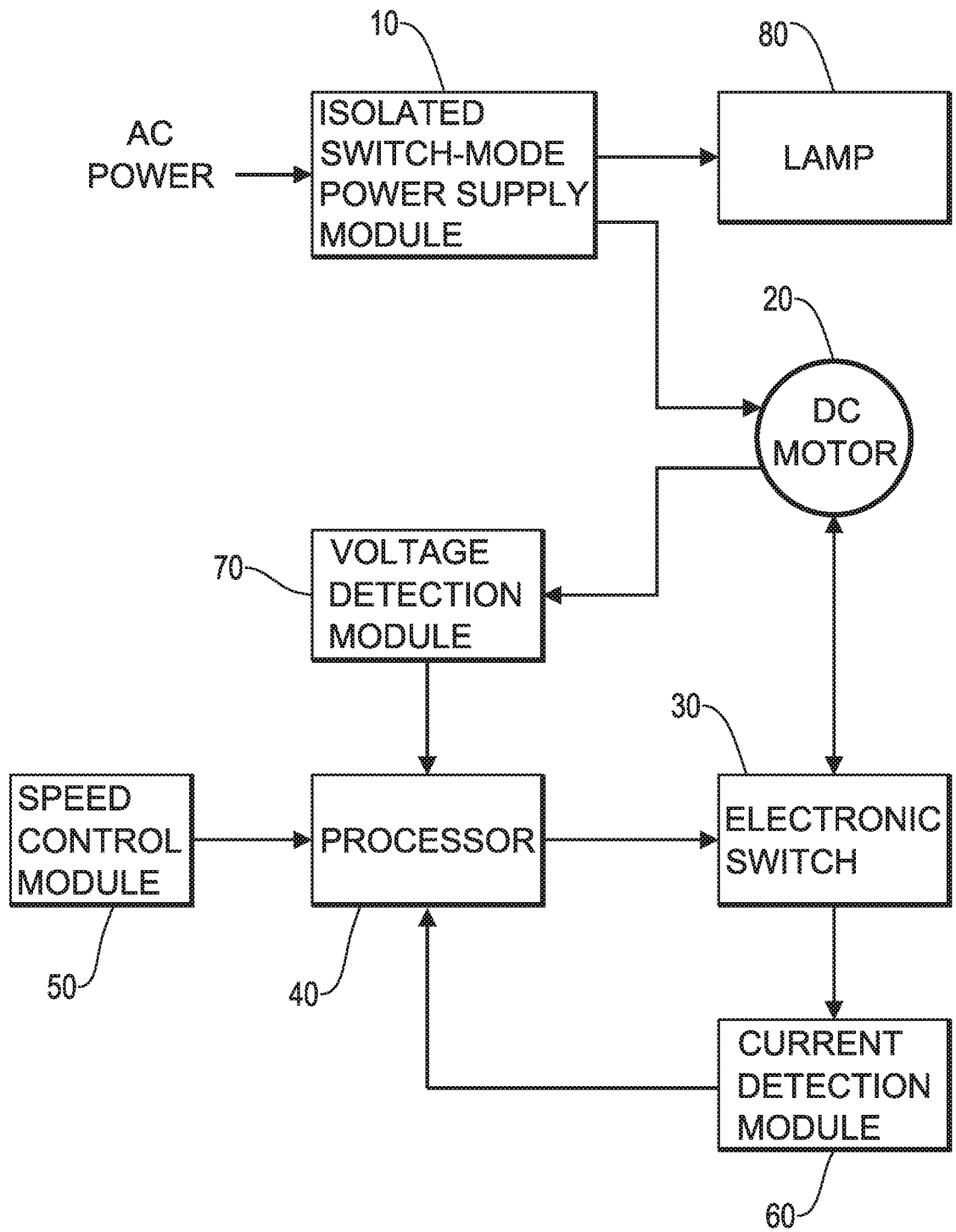
FIG. 3 is a functional block diagram of another embodiment of a closed-loop control device of a mechanical sewing machine in accordance with the present invention.

With reference to FIG. 3, another embodiment of a closed-loop control device of a mechanical sewing machine in accordance with the present invention differs from the foregoing embodiment in having an additional lamp 80 connected to another output terminal of the isolated switch-mode power supply module 10. The lamp 80 may be an LED. The LED voltage Vs of the output winding of the transformer 13 supplies power to the lamp 80.

Figure 4:
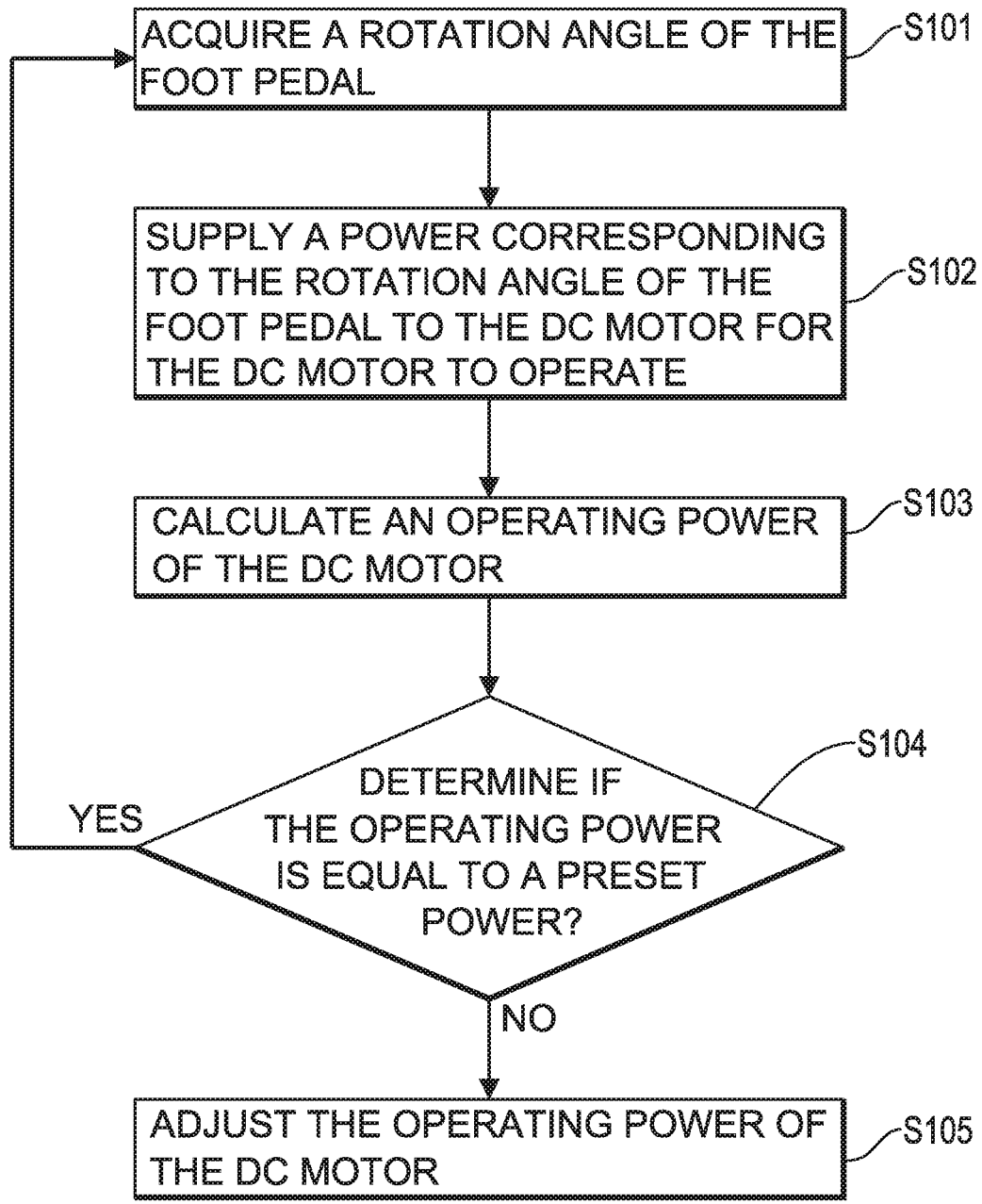
FIGS. 4 to 6 are flow diagrams of a method for controlling the closed-loop control devices in FIGS. 1 and 3.

With reference to FIG. 4, a method for controlling the foregoing closed-loop control device is performed by a mechanical sewing machine including the closed-loop control device and includes the following steps.

Step S101: Acquire a rotation angle of the foot pedal 51.

Step S102: Supply a power corresponding to the rotation angle of the foot pedal 51 to the DC motor 20 for the DC motor 20 to operate.

Step S103: Calculate an operating power Pr of the DC motor 20.

Step S104: Determine if the operating power Pr is equal to a preset power Pc. If the operating power Pr is equal to the preset power Pc, resume step S101. Otherwise, perform step S105.

Step S105: Adjust the operating power Pr of the DC motor 20.

After the rotation angle of the foot pedal 51 is acquired in step S101, the foot pedal 51 outputs a speed signal corresponding to an operating voltage varying with the rotation angle to the processor 40. The processor 40 generates a control signal according to the speed signal and transmits the control signal to the gate of the electronic switch 30 to control a turn-on time of the electronic switch 30 for adjusting the duty cycles of an operating current and an operating voltage to the DC motor 20, so as to drive the DC motor 20 according to the rotation angle as performed in step S102. The current detection module 60 and the voltage detection module 70 further feedback an operating current signal and an operating voltage signal of the DC motor 20 to the processor 40 for the processor 40 for the processor 40 to calculate the operating power Pr actually outputted by the DC motor 20 as performed in step S103. A comparison between the operating power Pr and the preset power Pc is performed in step S104. If the operating power Pr is identical to the preset power Pc, step S101 is resumed to acquire the rotation angle of the foot pedal 51 again. If the operating power Pr is not identical to the preset power Pr, the operating power is adjusted through closed-loop control as performed in step S105.

Figure 5:
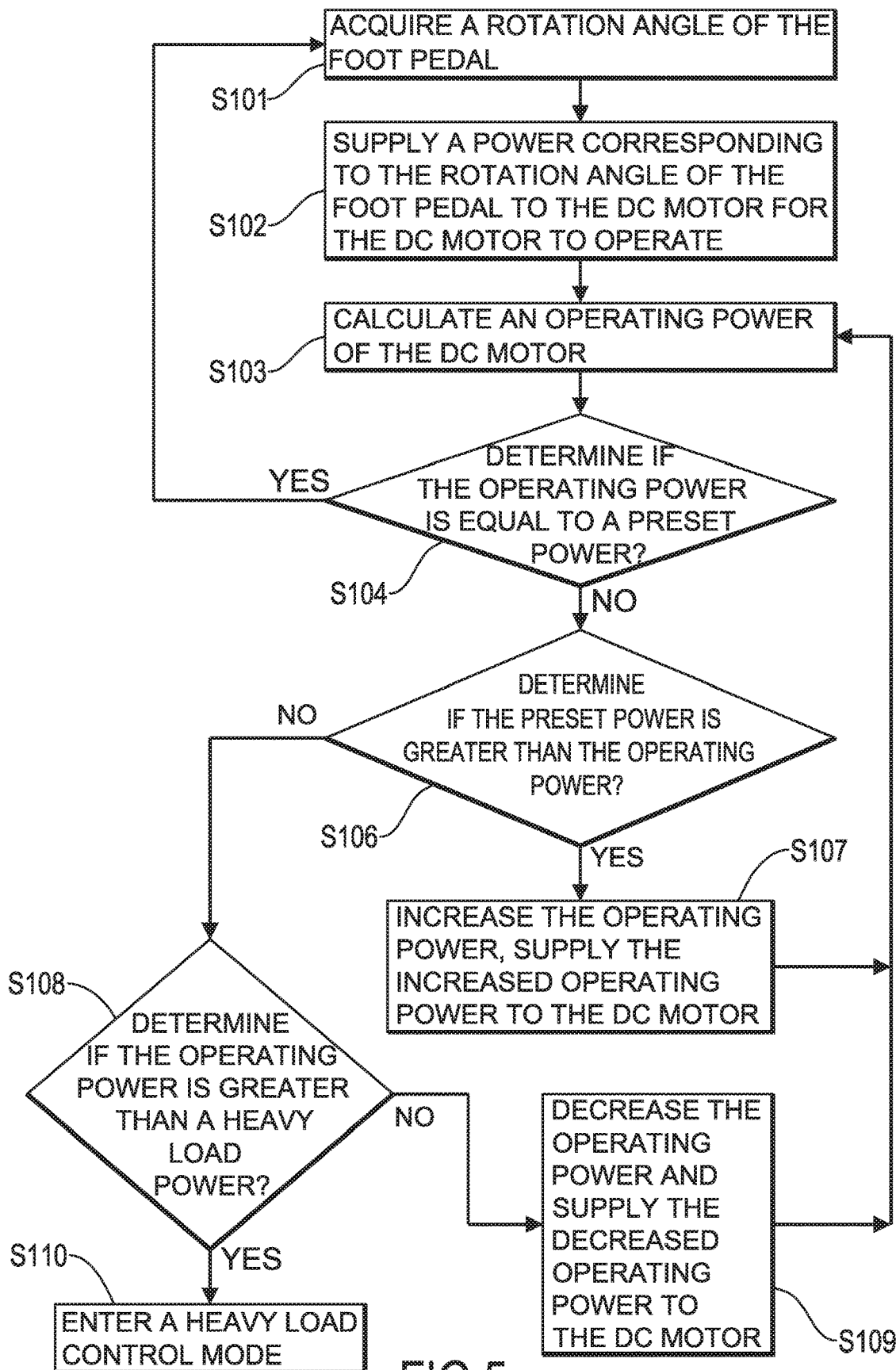

With reference to FIG. 5, step S105 further includes the following steps.

Step S106: Determine if the preset power Pc is greater than the operating power Pr. If the preset power Pc is greater than the operating power Pr, perform step S107. Otherwise, perform step S108.

Step S107: Increase the operating power Pr, supply the increased operating power to the DC motor 20, and return to step S103.

Step S108: Determine if the operating power Pr is greater than a heavy load power. If the operating power Pr is greater than a heavy load power, perform step S110. Otherwise, perform step S109.

Step S109: Decrease the operating power Pr, supply the decreased operating power to the DC motor 20, and return to step S103.

Step S110: Enter a heavy load control mode.

Prior to adjustment of the operating power Pr, whether the preset power Pc is greater than the operating power Pr should be determined first as performed in step S106. If the preset power Pc is greater than the operating power Pr, it indicates that the operating power Pr is insufficient as compared with the preset power Pc. The closed-loop control is applied by using the processor 40 to increase the duty cycles of the operating current and the operating voltage to the DC motor 20 and further raise the operating power Pr of the DC motor 20 as performed in step S107. After the operating power Pr is raised, resume step S103 to calculate the operating power Pr of the DC motor 20. On the other hand, if the preset power Pc is less than the operating power Pr, the operating power Pr is further determined whether it is greater than the heavy load power as performed in step S108 to ascertain if the mechanical sewing machine is under a state of sewing through multiple layers of fabrics. If the operating power Pr is less than the heavy load power, the mechanical sewing machine is determined not to be under the state of sewing through multiple layers of fabrics, and the processor 40 thus reduces the duty cycles of the operating voltage and the operating current to the DC motor 20 to lower the operating power Pr of the DC motor 20 as performed in step S109. After the operating power Pr is decreased, step S103 is resumed to calculate the operating power Pr of the DC motor 20.

As can be seen from the foregoing description, the closed-loop control in accordance with the present invention controls the operating power Pr supplied to the DC motor 20 to approach the preset power Pc, tackling the issue of conventional DC motors that when the operating power of the DC motor is less than a preset power, the rotation angle of the foot pedal needs to be continuously increased to maintain a constant rotation speed of the DC motor and thus cost additional power loss and load to the DC motor 20, which consumes more power and results in a shorter life duration of the DC motor 20.

Alternatively, if the operating power Pr is greater than the heavy load power, the mechanical sewing machine is determined to be operated under the state of sewing through multiple layers of fabrics, and the heavy load control mode should be entered accordingly.

Figure 6:
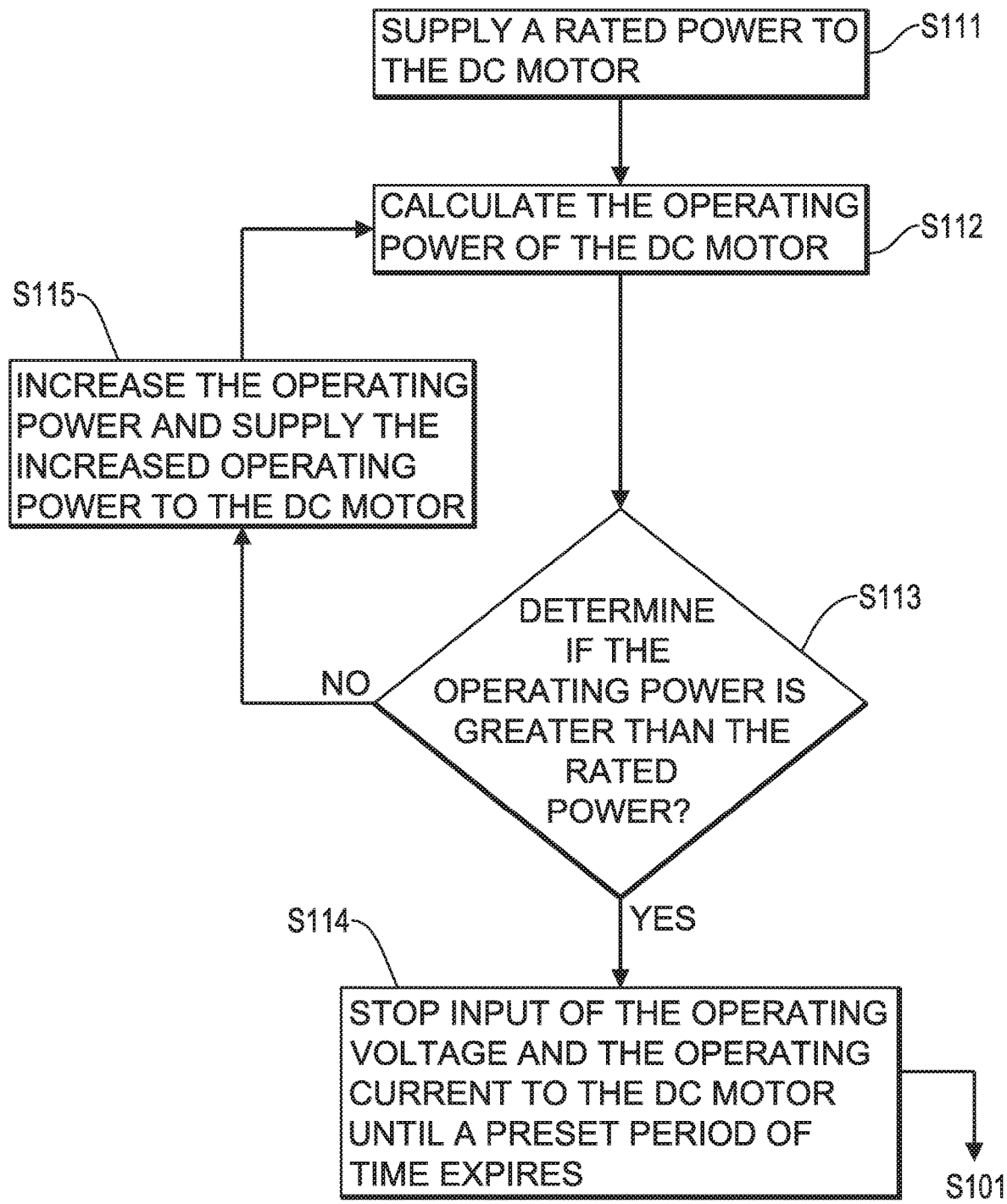
Figure 7:
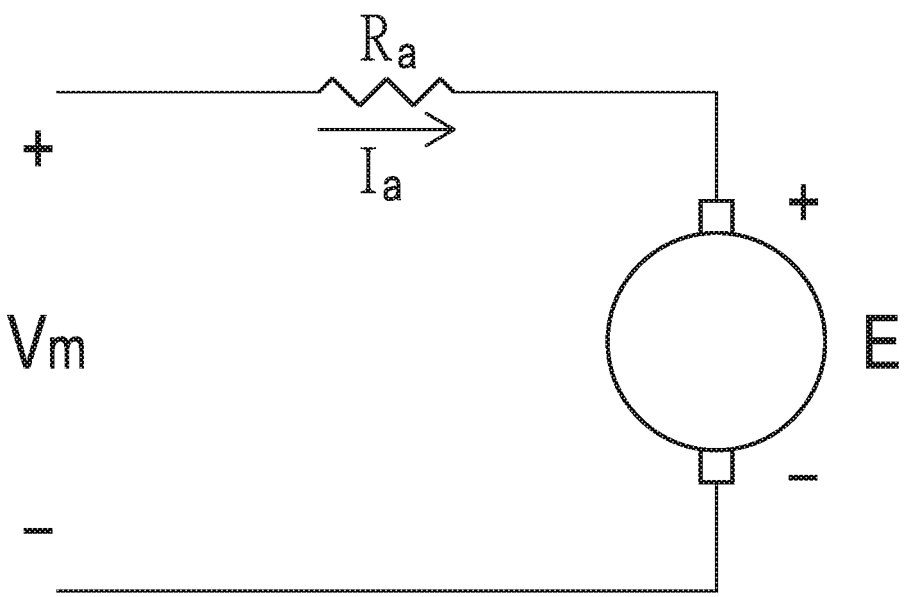
FIG. 7 is an equivalent circuit diagram of a conventional DC motor.

With reference to FIG. 6, the foregoing heavy load control mode includes the following steps.

Step S111: Supply a rated power Pm to the DC motor 20.

Step S112: Calculate the operating power Pr of the DC motor 20.

Step S113: Determine if the operating power Pr is greater than the rated power Pm. If the operating power Pr is greater than the rated power Pm, perform step S114 and resume step S101. Otherwise, perform step S115 and resume step S112.

Step S114: Stop input of the operating voltage and the operating current to the DC motor until a preset period of time expires.

Step S115: Increase the operating power Pr, supply the increased operating power to the DC motor 20, and return to step S112.

When the heavy load control mode of the closed-loop control method is performed, the processor adjusts the duty cycles of the operating voltage and the operating current to the DC motor 20 to raise the operating power of the DC motor 20 up to the rated power Pm as performed in step S111. The current detection module 60 and the voltage detection module 70 respectively feedback the operating voltage signal and the operating current signal associated with the DC motor 20 to the processor 40 for the processor 40 to calculate the operating power Pr actually outputted from the DC motor 20 as performed in step S112. Whether the operating power Pr is greater than the rated power Pm in step S113 is to ascertain if the mechanical sewing machine is still operated under a state of sewing through multiple layers of fabrics. If the operating power Pr is not greater than the rated power Pm, it indicates that the state of sewing through multiple layers of fabrics or the heavy load control mode is not finished yet, such that the closed-loop control is applied by using the processor 40 to increase the duty cycles of the operating current and the operating voltage to the DC motor 20 and further raise the operating power Pr of the DC motor 20 as performed in step S115, and after step S115 is completed, step S112 is resumed calculate the operating power Pr actually outputted from the DC motor 20. On the other hand, if the operating power Pr is greater than rated power Pm, it indicates that the state of sewing through multiple layers of fabrics or the heavy load control mode is completed, and the input of the operating voltage and the operating current to the DC motor 20 is stopped until a specified period of time expires as performed in step S114 and then step S101 is resumed to acquire the rotation angle of the foot pedal 51.

Steps S111 to S113 and S115 are dedicated to the job of sewing through multiple layers of fabrics, and during the heavy load control mode, the closed-loop control is applied to drive the DC motor 20 to drive the DC motor 20 to repeatedly increase power supplied to the DC motor 20 up to the rated power Pm, intending to maintain the DC motor 20 to be constantly operated at the operating power Pm throughout the sewing job though multiple layers of fabrics. Such closed-loop control provides applicability of the DC motor 20 with relatively low power to sewing job through multiple layers of fabrics, which is accustomed to be done by high-power HV DC motor of conventional mechanical sewing machines, and such applicability brings forth operation of DC motor at lower power and with less electricity consumption. In some relevant tests, conventional mechanical sewing machines require 80 watts to sew through twelve layers of TC (Thread Count) fabric whose composition is 65% of polyester and 35% of cotton, and the mechanical sewing machine using the closed-loop control device in accordance with the present invention just requires 30 to 40 watts to sew through the same TC fabric and thus reduces electricity consumption and lowers the load and operating temperature of the DC motor to prolong the life duration of the DC motor. When a conventional mechanical sewing machine is equipped with the closed-loop control device in accordance with the present invention, the conventional mechanical sewing machine can be operated with a low-voltage (LV) DC motor instead and thus extends its life duration from 500 hours to at least 2000 hours without the issue of frequent DC motor replacement arising from the need of a HV DC motor.

As HV DC motors are usually more costly than LV DC motors, the mechanical sewing machines using the LV DC motor with lower voltage are more inexpensive and less power-consuming and has higher safety tackling issues of brush sparking and temperature rise at work as compared with conventional mechanical sewing machines using HV DC motors. Additionally, as far as lower equipment cost arising from no need of rotation encoder and less complicated control circuit are concerned, the mechanical sewing machines with the closed-loop control device in accordance with the present invention have higher acceptance in the market than those without.

Based on the description of the foregoing closed-loop control device and the method for controlling the closed-loop control device, there are two control modes, namely a regular power control mode and a heavy load control mode.

The regular power control mode, which is intended for the DC motor operated at the stable preset power, is discussed here first. The rotation angle of the foot pedal is controlled with the speed signal having a corresponding power inputted to the processor. The processor adjusts the control signal according to the speed signal and sends the control signal to control the turn-on time of the electronic switch, so as to adjust the operating power and the rotation speed of the DC motor by varying the duty cycles of voltage and current to the DC motor. The voltage detection module and the current detection module respectively acquire an operating voltage signal and an operating current signal associated with the operating voltage and the operating current of the DC motor. The processor then calculates the operating power according to the operating voltage signal and the operating current signal and adjusts the operating voltage and the operating voltage of the DC motor with the closed-loop control. When the operating power is not equal to the preset power, the operating power may be either less than or greater than the preset power. In the former case, the operating power needs to be raised by increasing the operating power and supplying the increased operating power to the DC motor until the operating power calculated again is equal to the preset power. In the latter case, the possibility of the DC motor operated under the heavy load control mode should be ruled out here, and the circumstance we concern is when the operating power is not greater than the heavy load power. Under the concerned circumstance, the operating power needs to be lowered by decreasing the operating power and supply the decreased operating power to the DC motor until the operating power calculated again is equal to the preset power. The closed-loop control approach of adjusting the operating power of the DC motor during the regular targets at adjusting the operating power to be identical to the preset power to avoid the issues of excessively high current and voltage, escalated load power, more power consumption and shorter life cycle of the HV DC motor, which results from higher operating voltage due to the increase of the rotation angle of the foot pedal for maintaining or increasing the rotation speed of the HV DC motor while the operating voltage of the DC motor decreases as the operating current of the DC motor increases.

Furthermore, during the heavy load control mode upon sewing through multiple layers of fabrics or when the operating load is greater than the heavy load power, the operating power of the DC motor needs to be compared with the rated power and the operating power may be either greater than the rated power or not. In the former case, because the sewing needle has penetrated through all the layers of fabrics to be sewed, it indicates that the heavy load control mode is done and a rotation angle of the foot pedal should be acquired again for other sewing works. In the latter case, the closed-loop control approach of adjusting the operating power of the DC motor until the operating power approaches but does not exceed the rated power, such that the DC motor can be operated with an operating power approximating to but lower than the rated power during sewing through multiple layers of fabrics. Such closed-loop control approach also ensures operation at a lower power and with less electricity consumption and equipment cost for the heavy load control mode.

As to other advantages, due to the use of the isolated switch-mode power supply module, users can be isolated from power source to enhance operational safety. Additionally, the processor adjusts the operating voltage according to the speed signal provided by the speed control module to secure accuracy in terms of adjustment of the operating voltage.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A closed-loop control device of a mechanical sewing machine, comprising:
    an isolated switch-mode power supply module having:
        an input terminal adapted to connect to an AC (Alternating Current) power source; and
        an output terminal outputting an output voltage;
    a DC (Direct Current) motor connected to the output terminal of the isolated switch-mode power supply module to receive the output voltage;
    a speed control module outputting a speed signal;
    a processor connected to the speed control module and outputting a control signal according to the speed signal;
    an electronic switch connected between the DC motor and the processor, controlling a turn-on time of the electronic switch according to the control signal, and adjusting an average operating voltage of the DC motor;
    a current detection module connected between the electronic switch and the processor, detecting an operating current of the DC motor, and generating an operating current signal; and
    a voltage detection module connected between the DC motor and the processor, detecting an operating voltage of the DC motor, and generating an operating voltage signal;
    wherein the processor further adjusts the control signal according to the operating current signal and the operating voltage signal; and
    wherein the isolated switch-mode power supply module has:

a rectification unit connected to the input terminal of the isolated switch-mode power supply module and rectifying an AC power from the AC power source to a DC voltage;

a transformer having:
  a primary side connected to the rectification unit and receiving the DC voltage outputted from the rectification unit; and
  a secondary side;

a voltage regulation unit connected to the primary side of the transformer, and having:
  an electronic power switch;
  a PWM (Pulse Width Modulation) IC (Integrated Circuit) controlling a turn-on time of the electronic power switch and adjusting a duty cycle of the DC voltage from the primary side of the transformer; and
  a rectifier and filter circuit connected between the secondary side of the transformer and the output terminal of the isolated switch-mode power supply module.

2. The closed-loop control device as claimed in claim 1, wherein the isolated switch-mode power supply module further has a voltage feedback circuit connected between the output terminal of the isolated switch-mode power supply module and the PWM IC, and having:
  a voltage comparator connected to the output terminal of the isolated switch-mode power supply module and outputting a feedback voltage; and
  an opto-coupler connected to the voltage comparator, receiving the feedback voltage, generating a feedback voltage signal according to the feedback voltage, and outputting the feedback voltage signal to the PWM IC for the PWM IC to adjust the DC voltage from the primary side of the transformer according to the feedback voltage signal.

3. The closed-loop control device as claimed in claim 1, wherein the speed control module is connected to a foot pedal, wherein the foot pedal is connected to an input power to the processor, the speed control module adjusts the speed signal by varying a rotation angle of the foot pedal.

4. The closed-loop control device as claimed in claim 1, wherein a lamp is connected to another output terminal of the isolated switch-mode power supply module and is an LED.

* * * * *